Figure 1:
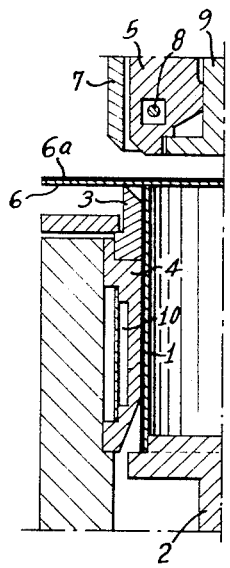

Oct. 10, 1967 R. BECK 3,346,435
APPARATUS FOR FORMING CONTAINERS FROM SYNTHETIC PLASTIC FILMS
Filed Nov. 13, 1962

INVENTOR.
RUDOLF BECK
BY
ATTORNEY

United States Patent Office 3,346,435
Patented Oct. 10, 1967

3,346,435
APPARATUS FOR FORMING CONTAINERS FROM SYNTHETIC PLASTIC FILMS
Rudolf Beck, Wiesbaden, Germany, assignor to Kalle Aktiengesellschaft, Wiesbaden-Biebrich, Germany
Filed Nov. 13, 1962, Ser. No. 237,211
Claims priority, application Germany, Nov. 16, 1961, K 45,215
6 Claims. (Cl. 156—423)

This invention is concerned with can-like containers made from films having a weldable synthetic plastic surface, and process and apparatus for their manufacture. Such containers may be used, for example, for preserving condensed milk, sardines in oil, fruit and vegetables.

Canning containers generally consist of three parts, namely the so-called can body, the cam bottom or under-lid, and the top lid of the can. Containers made from weldable synthetic plastic films, or laminated films having a weldable plastic surface, can be made by joining the parts of the container by welding. The hitherto known containers made from plastic films have, however, a relatively wide edge. Furthermore, no simple, rapid method for the manufacture of reliably welded containers from such plastic films has become known hitherto.

In the following description the terms "can body," "can under-lid" or "can bottom," and "can top lid" are retained to described the three parts making up the can-like container. The term "can body" is used to designate a can wall alone, also in such cases where the can wall represents a portion of a one-piece structure comprising the can wall and either the under-lid or the top-lid, which structure may be made, for example, by deep drawing. (Where the one-piece structure comprises the can wall and the top-lid, such structure may be used by filling it after reversal, applying the bottom-lid as hereinafter described, and reversing the can once more.) Moveover, the term "can-lid" is used to indicate either the can under-lid or the can top lid.

One feature of the invention is a can-like container, made from a film having a heat-weldable plastic surface, with heat-weldable plastic surface inside and consisting of a can lid welded on to a can body, which container is among other features distinguished by the fact that the welded seam is particularly narrow so that very little space is lost when a very large number of cans are assembled on a support. The container of the invention is distinguished by a can lid which is inserted into an opening of the can body and has a bent-up edge of an essentially cylindrical shape and is welded on to the can body on the inside.

Another feature of the invention is a process for the manufacture of the above and similar containers from films having a weldable plastic surface by welding the can body and the can lid together. It has been observed, that a great advantage arises in manufacturing the containers from the said films by placing a flat can lid, which is larger than the opening of the can body to be welded thereto, on the opening so that it overlaps it all round, the can lid then being pressed into the can body opening while heating the margin of the lid, whereby said opening is distended, at the same time the margin of the can lid is bent up and pressed together with the can body margin and the two are welded together, whereupon, if desired, the welded can body margin is returned to the position it occupied before being distended while at the same time further bending up the welded portion of the can lid.

Another feature of the invention is an apparatus for the manufacture of can-like containers by welding together a can body and a can lid, from films having a weldable plastic surface, according to the process of the invention. The apparatus is characterized in that it comprises a lower piston for positioning the can body, a superimposed jacket with outwardly inclined top opening for surrounding the can body, a welding piston which is located above the jacket and is bevelled so as to fit into the outwardly inclined opening, an ejector piston located within the welding piston, a heating means for heating the welding piston and a cooling means for cooling a portion of the jacket located below the inclined opening, the lower piston, welding piston and ejector piston all being reciprocable.

The film material used in the present process is a weldable synthetic plastic film or a laminated film of which at least one external layer consists of weldable plastic. Inter alia, there may be used polyethylene films manufactured in any manner and also other polyolefin films. In cases where it is intended to sterilize by heat the contents of the container in the container itself, those polyolefin films are suitable of melting point above the sterilization temperature used, preferably above 100° C., for example polyethylene or polypropylene manufactured by the so-called low-pressure process. The plastic films used may contain fillers. Very suitable for the performance of the present process are metal foils, for example aluminum foils, bearing on at least one side a weldable coating, for example a coating of high-pressure or low-pressure polyethylene. Such laminates with metal plies have the advantage that they are practically completely gas tight. It is possible to render the contents of a closed container visible when at least one part of the container is made from a transparent material. The invention includes all forms of containers made from a can body which has no sharp corners, and is welded together with at least one can lid, for example cylindrical containers of the type of the known condensed milk tins, rectangular containers with rounded corners of the type of sardine tins or dish-shaped, round containers closed with a lid, hitherto consisting in general of a glass dish with a sheet metal lid and used as containers for fish roe delicatessen.

The present process is advantageously performed with the use of an apparatus which performs the welding together of the can body and lid and at the same time also blanks can lids out of a film web. In the following description reference is made to such an apparatus. Alternatively, the can lids may be blanked out in an operation independent of the production of the cans by welding together the can body and lid.

Figure 5:
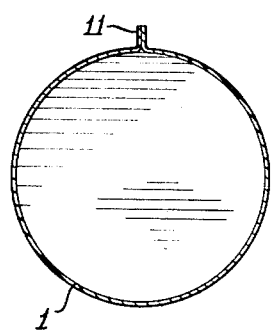
Figure 6:
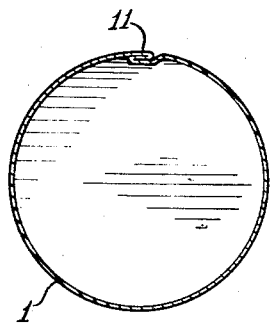
Figure 7:
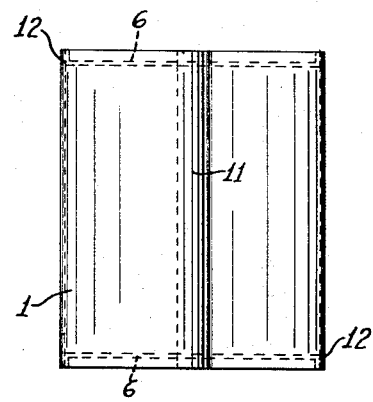

The invention is illustrated by way of example in the accompanying drawings, in which:

FIGS. 1 to 4 are sections showing the lefthand half of an apparatus for performing the present process in different stages of the process, FIGS. 5 and 6 are each a transverse section through the body of a container, and FIG. 7 is a corresponding elevation.

Figure 2:
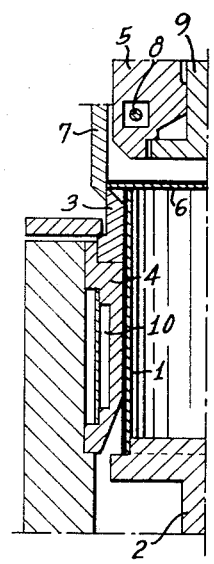
Figure 3:
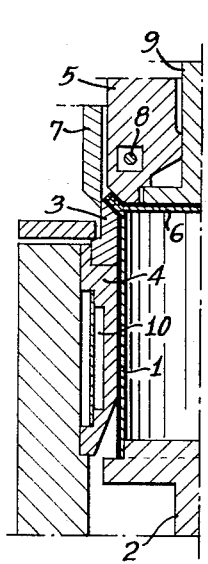
Figure 4:
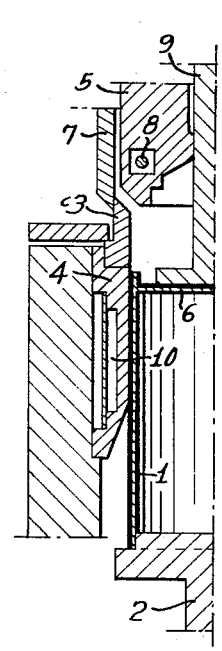

Referring to FIGS. 1 to 4 of the drawings, a container is manufactured from a laminated film, consisting of a weldlable plastic ply shown hatched and a non-weldable ply, for example an aluminum foil, which is indicated by a heavy line in the drawing. A can body 1 is manufactured in any desired manner from the laminated film; it is placed upon a lower piston 2, being closely surrounded by a jacket which is located above the lower piston 2 and in the case illustrated consists of an upper portion 3 and a lower portion 4. The inner wall of the upper jacket portion 3 is inclined at its top edge. Above the jacket 3 there is located a welding piston 5 whose lower edge is so inclined as to fit the inclined upper portion of the jacket 3. Between the upper portion of the jacket 3 and the welding piston 5, flat can lid 6, which is larger than the can body opening, is so placed on the can body 1 that it overlaps the edge of the can body all round. The positioning of the can lid is very simple to perform: A film 6a consisting of the desired material, more especially a film web running off a supply roll, not illustrated, is supplied by means of a pair of transport rollers, also not illustrated, to the edge of the can body, and the lid is blanked out of the positioned film. In the illustrated example this is achieved with the aid of a cutting cylinder 7 which surrounds the welding piston 5 and the upper jacket portion 3, which is designed to act as auxiliary cutting tool. For blanking out the can lid the cutting cylinder 7 is moved downwards. FIG. 2 shows the stage after the can lid 6 has been blanked out. The welding piston 5 is then lowered by a desired distance and then arrested, the effect being that it presses the can lid 6 into the can opening while splaying out the can body margin and turning back the can lid margin, finally pressing the inclined margins of the can body and can lid together as desired. The welding piston 5 is heated by a heating means 8 to a degree such that, while pressing them together, it also welds the lid and body margins Surprisingly, a very narrow welding seam will suffice. For containers of the size of condensed milk tins containing about 100 g., a welding seam of a width, for example, of 0.5 to 2 mm. will suffice. In FIGS. 1 to 4 for clarity the welding seam is shown relatively wider than is necessary.

In pressing the can lid 6 into the can body 1 it is of advantage when a mobile ejector piston 9 located inside the welding piston 5 co-operates with the latter by being moved downwards with it in a manner such that together they press the whole of the can lid 6 by the desired distance into the can body opening. When the margins of the can body and lid have been welded together to form a weld 12 (FIG. 7), while the welding piston 5 is arrested or raised, the ejector piston 9 and the lower piston 2 are lowered so that the can body 1 with the can lid 6 attached is pushed through the jacket portions 3 and 4. During this operation, the welded portion of the can body is returned to its original position as it passes through the upper jacket portion 3, which may be heated, the weld is stabilized and in the contiguous jacket portion 4 the weld is cooled. For this purpose it is of advantage to provide the lower jacket portion 4 with a cooling space 10. The can body with lid leaves the welding apparatus through the lower opening of the jacket.

The movements of supply devices for can bodies and for the film web from which the lid of the can is made are so synchronized by mechanical means with the movements of the welding piston, of the cutting cylinder, of the lower piston, and of the ejector piston, that the individual components are kept in a suitable continuous movement. The programme of the raising and lowering of the pistons and of the cutting cylinder may be controlled, for example, by means of cams.

The present process may be applied to the welding of both the upper and lower lids to the body of the can. If desired, only one lid is welded to the can body according to the present process, whereas the other lid is connected with it by some other method or is made together with it in one piece, for example by the deep-draw method from a film web.

The present process facilitates the manufacture of containers for foodstuffs from metal foils that carry a weldable plastic coating only on one face. In such a case the can body 1 is formed from a rectangular laminated foil section, the side coated with the weldable plastic being turned inside and the margins of the section which form the can body weld 11 being allowed to project radially and welded together by their weldable plastic surfaces, as shown in FIG. 5. The radially projecting can body weld 11 is then folded over and pressed into the can body 1, as shown in FIGS. 6 and 7. The present lid welding process can be performed successfully with a can body thus formed, and there is no special difficulty involved in ensuring that the weld between the can body and the can lid is perfectly tight.

By the present process it is possible to mass-produce, in a relatively simple manner, containers from films having one or two weldable plastic surfaces, or also to close them with a lid after filling, so that complete tightness of the welds is assured. Since the process can also be performed with films and foils having a weldable plastic layer on one side only, there arises the added advantage that it is possible to use metal foils coated with plastic material on one side only, more especially aluminum foil coated with plastic material on one side only, which foil is much easier to manufacture than one that is coated on both sides. It is another advantage of the present process, as above stated, that relatively narrow welds suffice so that in packing such containers much less space is wasted.

It will be obvious to those skilled in the art that many modifications may be made within the scope of the present invention without departing from the spirit thereof, and the invention includes all such modifications.

What is claimed is:

1. An apparatus for the manufacture of can-like containers comprising a piston means for supporting a can body, a jacket adapted to surround a can body supported on the piston means and having a beveled upper end, a reciprocatable welding element mounted above the jacket and having a beveled lower edge corresponding to the bevel on the jacket, and means for ejecting a welded can from the jacket.

2. An apparatus according to claim 1 in which the means for ejecting a welded can from the jacket is a piston mounted on the welding element.

3. An apparatus according to claim 1 in which the welding element includes a heating means.

4. An apparatus according to claim 1 in which a portion of the jacket below the beveled upper end is cooled.

5. An apparatus according to claim 1 in which a reciprocatable cutting means is mounted above the jacket.

6. An apparatus according to claim 1 in which a reciprocatable cutting means is mounted above the jacket and surrounds the welding element.

References Cited

UNITED STATES PATENTS

| 1,708,828 | 4/1929 | Bremmerman | 156—69 |
| 2,259,256 | 10/1941 | Maas et al. | 93—55.1 |
| 2,285,220 | 6/1942 | Morrell | 229—3.5 |
| 2,353,762 | 7/1944 | Robinson et al. | 229—3.5 |
| 2,588,604 | 3/1952 | Archer | 18—59 |
| 2,633,095 | 3/1953 | Magill et al. | 93—39.1 XR |
| 2,725,597 | 12/1955 | Douglass | 18—19 |
| 2,823,418 | 2/1958 | Fritts | 18—19 |
| 3,052,926 | 9/1962 | Quinche et al. | 18—59 |
| 3,144,495 | 8/1964 | Makowski | 264—248 |

EARL M. BERGERT, *Primary Examiner.*

J. DRUMMOND, *Examiner.*

J. P. MELOCHE, D. T. MOORHEAD,
*Assistant Examiners.*